Sept. 5, 1967 W. L. PROBERT ETAL 3,340,409

CODED CONTROL APPARATUS

Filed Feb. 28, 1963

INVENTORS.
WALTER L. PROBERT
KEITH N. SHADE
BY
ANDRUS & STARKE
ATTORNEYS.

United States Patent Office 3,340,409

Patented Sept. 5, 1967

3,340,409

CODED CONTROL APPARATUS

Walter L. Probert, Erie, and Keith N. Shade, Wesleyville, Pa., assignors to A. O. Smith Corporation, Milwaukee, Wis., a corporation of New York Filed Feb. 28, 1963, Ser. No. 261,583

9 Claims. (Cl. 307—115)

ABSTRACT OF THE DISCLOSURE

A code card reader includes a common contact plate engaged by a plurality of aligned laterally spaced brushes with a code card disposed therebetween. The code card is provided with rows of code apertures which are to be selectively and sequentially aligned with the brushes. The brushes and the contact plate are connected in a circuit with the contact plate forming a common terminal and the brushes each connected in a parallel branch control line. Further, each control line is provided with three switches with the corresponding switches in each line being ganged to each other and to a rotary arm. The switches are normally closed. Rotation of the rotary arm selectively actuates the switches from the closed to the open position. One switch in each line connected to a brush aligned with an aperture is opened to prevent completion of the output circuit and thereby permit operation of some other electrical device.

Figure 1:
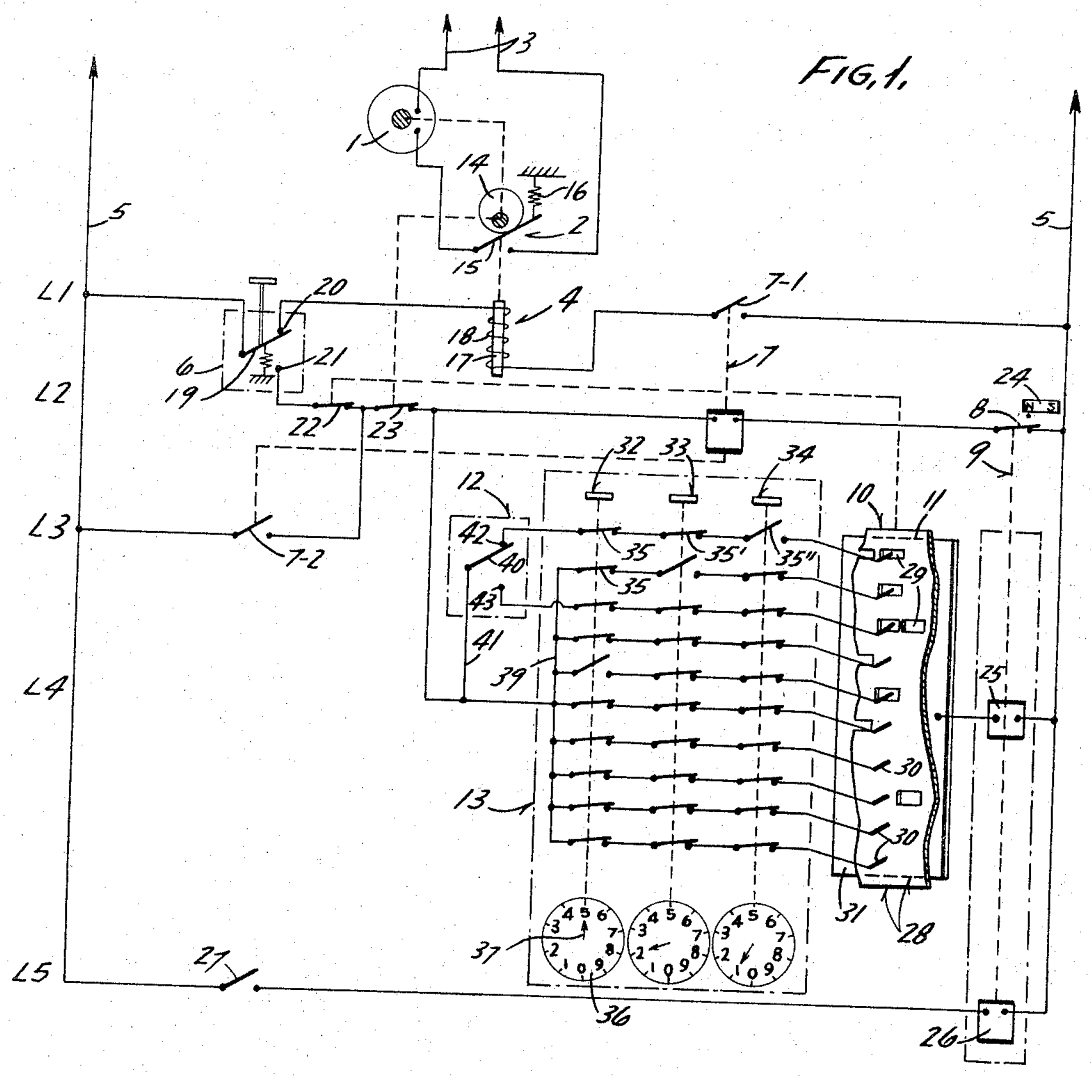

This invention relates to a coded control apparatus and particularly to a code input system for cooperative action with a code unit such as a perforated code card.

In coded control systems, a multiple branch electrical control circuit can be provided with completion thereof made dependent on a code element such as a perforated code card. Multiple input means are provided which must be related to the location of the perforations in order to properly complete the circuit. For example, the copending application of Charles D. Erickson entitled, Coding Apparatus, which was filed on Mar. 13, 1962, with Ser. No. 179,373, now Patent No. 3,247,425 and which is assigned to a common assignee herewith, discloses a control employing a perforated control card carrying a series of code rows which are sequentially aligned with code reading brushes. Ten input buttons are provided for actuating control switches in accordance with the locations of the apertures. If the switches related to the code are not properly actuated operation of the control system is prevented. Although such systems provide highly satisfactory circuit controls, they require a relatively substantial number of components which are subjected to the usual malfunctioning and wear. Further, as noted therein the ten control buttons are provided three or more of which are actuated in accordance with the selected code to maintain maximum security.

The present invention is particularly directed to an improved input for reading of a code card or the like, with a substantial reduction in components and cost and a consequent increase in reliability and life of the system.

In accordance with the present invention, a plurality of code switching units is provided, each of the switching units including a plurality of switches or other similar circuit altering means one for each of the code positions of the code carrier such as a code card. Corresponding switches of each of the switching units are interconnected with each other and with the circuit of a code reader of the code element to conjointly control each of the corresponding circuits or control lines formed thereby. Further, each of the switching units includes means for setting the corresponding switches in selected positions only one of which will correspond to the condition of the circuit control means of the code reader. For example, in a ten position code, each of the code switching units will encode ten switches and the corresponding switches of each unit may be connected in series with each other and with the code reading apparatus associated with the code card. The code switching units will then have to be actuated to condition the series circuits aligned with the apertures in the code card in a predetermined manner either to open or break the circuit in order to properly actuate the code circuit. Preferably the circuit is adapted to establish an output only if the circuit through the apertures is broken. This provides maximum reliability of operation in accordance with the teaching set forth in the previously referred to copending application of Charles D. Erickson. Applicant has found that employing wafer type switching units having a plurality of switches, a different one of which is opened at each of a plurality of switch settings, provides an extremely reliable and low cost input means.

The drawings furnished herewith illustrate the best mode presently contemplated for carrying out the invention.

Figure 2:
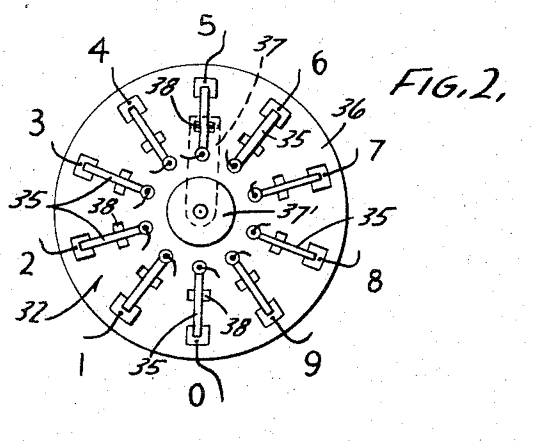

In the drawings:

FIG. 1 is a schematic circuit diagram of a coded control system incorporating the present invention; and FIG. 2 is an elevational view of a switch construction for the switch units diagrammatically shown in FIG. 1.

Referring to the drawings and particularly to FIG. 1, the embodiment of the invention generally includes an alternating current motor 1 as a controlled load and a cycling switch unit 2 which controls the operative connection of motor 1 to suitable A.C. power lines 3. Switch unit 2 is coupled to motor 1 and to a control solenoid 4 and conjointly actuated thereby. Solenoid 4 is connected in a branch line L–1 between suitable low voltage alternating current lines 5, as follows.

A two-way main control switch 6 is connected in one position in series in the line L–1 with the solenoid 4 and a set of normally open contacts 7–1 of a trigger relay 7 to conjointly control energization of the solenoid with the latter. Switch 6 is manually actuated and trigger relay 7 is controlled by the second position of switch 6. An interlock switch 8, forming a controlled part of an interlock relay unit 9, is connected in series with the trigger relay 7 and the control switch 6 in a branch line L–2. A card coded control 10 is connected in series with the relay unit 9 in a control line L–4 and establishes a plurality of paralleled circuits some of which are opened and others of which are completed in accordance with the perforations in a code card 11. A code selection switch unit 12 and a code input unit 13 are connected in series with the card coded control 10 and, if set in accordance with the code in the code card 11, prevent operation of the relay unit 9 and completion of the circuit therethrough.

As a result, the associated switch 8 of relay unit 9 remains closed to allow completion of the circuit through the trigger relay 7. When the main control switch 6 is moved to the code reading position, relay 7 is energized to close the associated contacts 7–1. As hereinafter described, a latching circuit is provided to maintain energization of the trigger relay 7 thereafter. The main control switch 6 is then returned to the normal position in circuit with the solenoid 4 which is energized as a result of the closed switch 6 and relay contacts 7–1. Solenoid 4 closes switch unit 2 and establishes a cycle of motor operation. However, if the code selection switch unit 12 and the input unit 13 are not properly actuated, the relay unit 9 is energized to mechanically lock or latch the switch 8 open and prevent operation of trigger relay 7 and therefore motor 1.

More particularly, in the illustrated embodiment, the motor 1 in addition to being connected to drive any suitable load such as a presetting release mechanism is coupled to drive a cam 14 having a generally spiral edge surface engaging the switch arm 15 of switch unit 2. An arcuate portion of the smallest cam diameter allows the arm 15 to move the open position under the action of a spring 16. The balance of the cam edge is such as to hold the switch arm 15 in the closed circuit position. The cam 14 in the standby position is positioned to place switch unit 2 open.

Solenoid 4 includes an armature 17 connected to the arm 15 of switch unit 2 and electromagnetically coupled or controlled by a winding 18 connected in line L–1. When the solenoid 4 is energized, the armature 17 and the attached switch arm 15 is attracted and the switch unit 2 closes and completes the circuit to the motor 1. The motor begins to run and rotates cam 14 with the larger diameter edge portion moving into engagement with the switch arm 15 to hold the switch unit 2 closed, independently of solenoid 4, until the smaller diameter portion is again aligned with the switch arm 15.

The main control switch 6 is a single-pole double-throw unit having a switch arm 19 connected to one side of the low voltage power lines 5. The switch 6 includes a solenoid control contact 20 connected in branch line L–1 and a code control contact 21 which is connected to branch lines L–2 and L–4. Contact 20 is connected to the solenoid winding 18 in series with the normally open trigger contact 7–1 in branch L–1. Switch arm 19 is biased to normally engage the contact 20 in any suitable manner. The branch line L–1 to the solenoid winding 18 is however maintained open by the trigger relay contact 7–1.

The control branch line L–2 includes a card related switch 22 which, as shown by a dashed line, is coupled to the code card 11. Switch 22 is held closed by proper positioning of a code card 11 in the card coded control 10. If the code card 11 is not properly located, the switch 22 is open and prevents completion of the control branch line L–2 for energizing of the trigger relay 7. The line L–2 further includes a serially connected cam operated reset switch 23 which is coupled to cam 14 for intermittent operation once during each complete cycle of rotation of the cam 14. The cam operated reset switch 23 is normally closed such that the trigger relay 7 is adapted to be energized whenever the main control switch 6 is actuated to move contact arm 19 from engagement with contact 20 and into engagement with the code control contact 21.

The trigger relay 7 in addition to the contact 7–1 includes a pair of holding or latching contacts 7–2 in a line L–3 connected in parallel with card related switch 22 and the main control switch 6. As a result, whenever trigger relay 7 is energized, the contact 7–2 closes and maintains energization of the relay independently of the switch 6.

The code branch line L–4 is connected in parallel with the trigger relay 7 and the interlocking switch 8 and is operatively connected to the lines 5 with relay 7 whenever the main control switch 6 is turned to the code check position.

Interlock relay unit 9 is a dual winding assembly including a suitable latch for holding the switch 8 in the open and closed position respectively. In the illustrated embodiment of the invention, a small holding magnet 24 is shown for holding switch 8 opened or closed. The unit 9 includes a winding 25 which is connected in branch line L–4 which is adapted to open the switch which is then latched in the open position independently of the winding 25 by a magnet 24. A reset winding 26 is connected in a branch line L–5 between lines 5 and is oppositely coupled to switch 8 to reset the switch 8 to the closed position in response to energization thereof. The switch 8 then remains in the closed position independently of the winding 26 until such time as winding 25 is effective to open the contacts. A normally open reset switch 27 is provided in series with the winding 26. Switch 27 is not accessible to the operation of units 12 and 13 but is restricted to supervisory personnel. For example, when the apparatus is connected in a remote inventory control such as shown in the previously referred to Erickson application, a key or other control for the switch 27 is maintained by the gasoline supplier such that an accidental or fraudulent misoperation of the coded control units 12 or 13 requires a service call.

The card coded control unit 10 which is connected in series with the relay winding 25 includes the code card 11 which is provided with a plurality of code rows 28 each of which includes code apertures 29. In the illustrated embodiment of the invention, each code row is provided with 10 code positions with three or four apertures per row. For purposes of illustration, the code rows or locations have been numerically related to the numerical characters or digits 0 to 9 inclusive. Unit 10 includes a bank of brushes 30 connected to the input unit 13, one brush for each of the code positions of card 11 and a common ground plate 31 which is connected to one side of the winding 25. The brushes 30 are laterally spaced with respect to the ground plate 31 in accordance with the spacing of the code position of code card 11 and are urged into contact with the ground plate in any suitable manner. In the presence of an aperture 29 a complete circuit is established between the corresponding brush 30 and the plate 31. In the absence of an aperture 29, the code card 11 maintains the brush 30 spaced from the plate 31 and the circuit therethrough open.

The input switch unit 13 includes three wafer type switch assemblies 32, 33 and 34 each of which is similarly constructed. Wafer switch assembly 32 is described with prime subscripts added to the corresponding elements of assemblies 33 and 34 respectively.

Wafer switch assembly 32, as shown in FIG. 2, includes 10 individual and independently operable switches 35 which are circumferentially distributed about and secured to a supporting base plate 36. Switch assemblies 32–34 are shown in FIG. 1 with the switches 35 vertically aligned for clarity of circuit illustration. Each of the switches 35 is related to a code digit 0–9 inclusive and thus to one of the brushes 30 to which they are serially connected. A rotary switch arm 37 is rotatably mounted on the base plate 36 for alignment with any one of the switches 35 and includes a cam 38 which mechanically actuates and opens the aligned switch 35. A small knob 38 or the like is provided for manual positioning of the arm 37.

The corresponding individual and independent switches 35′ and 35″ of switch assemblies 33 and 34 are connected in series with each other and with brushes 30 and thus establish ten individual circuit paths through the unit 13 three of which may be opened by proper positioning of the corresponding switch arms 37. These ten circuit paths are selectively connected at one end to the ground plate 31 through the brushes 30 and aligned apertures 29 and thereby to the one line 5. The opposite ends are connected in common by a jumper lead 39 except for the branches related to the decimal digits 1 and 3 which are connected in circuit through the code selection switch unit 12.

The illustrated code selection switch unit 12 is a single-pole, double-throw switch having a contact arm 40 connected by lead 41 to branch line L–4. A one digit contact 42 is connected to the corresponding end of the circuit path established by the input unit 13 and the card coded control 10. Similarly, a three digit contact 43 is connected to the corresponding line from unit 13. Operation of the code selection switch unit 12 effectively disconnects or opens the corresponding circuit for the digit 1 or the digit 3.

In summary, the illustrated embodiment of the invention operates as follows.

A code including an initial letter or number designation identifying the setting of the code selection switch unit 12 and the settings of switch assemblies 32, 33 and 34 is received in accordance with the location of apertures 29. Thus, the code shown may be identified as A for the one digit position of switch unit 12 and 521 for the switches 32, 33 and 34, respectively. The aperture 29 in the digit 3 position is broken at switch unit 12. Switch unit 12 and input unit 13 are set accordingly after which control switch 6 is momentarily moved to the code test or triggering position to condition lines L–2 and L–4 for operation.

If switch 12 and input unit 13 have been properly set, all circuits to winding 25 of interlock relay unit 9 remain open and unit 9 remains in a non-actuated position with the associated switch 8 closed.

The trigger relay 7 is therefore energized and closes the contacts 7–1 in branch line L–1 and the latching contacts 7–2 in line L–3.

When control switch 6 is returned to the normal position, the circuit to winding 18 of solenoid 4 is completed. Solenoid 4 acts to close switch unit 2 and energize motor 1 which drives the load, not shown, and the cycling cam 14 for one revolution.

During the cycle, motor 1 momentarily opens switch 23 in line L–2 and breaks the circuit to trigger relay 7 and contacts 7–1 and 7–2 open. The code control circuits of lines L–2 and L–4 are thereby returned to standby and operation of motor 1 is under the control of cam 14. At the end of one revolution, cam 14 allows switch unit 2 to open and the complete circuit returns to standby.

Preferably, code card 11 is automatically positioned to align a new code row 28 with the bank of brushes 30 and thus a new setting of code selection unit 12 and input unit 13 is required for the next operation of motor 1. For example, code card 11 or brushes 30 may be moved through a suitable carriage, not shown, which is coupled to cam 14 for selected repositioning during each cyclic movement of cam 14.

If an improper setting of unit 12 or 13 is made, a complete circuit path through line L–4 is created and when control switch 6 is placed in the code test or trigger position, the winding 25 is energized and moves switch 8 to the open position. An advantage of the present invention is that the several switches 32, 33 and 34 may be set in accordance with the given code and the input checked and corrected any time before operation of switch 6. Actuation of relay winding 25 latches switch 8 open which can only be reset or closed by energization of relay winding 26. The actuation of switch 27 in the energization circuit for winding 26 is controlled by the supervisory controller and consequently the improper setting must be made known.

With switch 8 open, trigger relay 7 cannot be energized and the control circuit for motor 1 is locked on the inoperable condition.

When switch 27 is actuated, winding 26 is energized to reset switch 8 to the closed switch position and thereby return the control circuit to an operable status.

Although the illustrated embodiment of the invention employs a code card described as being movable relatively to a set of reading brushes, any other suitable code establishing means can be provided. Further, if a code card or the like is employed, relative movement can be eliminated and a plurality of sets of reading brushes or the like provided with a sequential control provided for sequentially operatively connecting the several sets of reading brushes in the circuit.

The present invention provides a reliable and inexpensive code input assembly for coded controls and the like.

Various modes of carrying out the invention are contemplated as being within the scope of the following claims particularly pointing out and distinctly claiming the subject matter which is regarded as the invention.

We claim:

1. In a coded control unit, (a) an electroresponsive load, (b) a first electroresponsive controller having switching means connected in series with the load, (c) a second electroresponsive controller having switching means connected in series with said first electroresponsive controller, (d) a two position switch means having a first position adapted to connect the load to a source of power and a second position adapted to connect the second electroresponsive means to a source of power, (e) a coded circuit connected in parallel with the first electroresponsive controller and including a plurality of paralleled control lines connected in series with said second electroresponsive controller, (f) a coded means having a plurality of code operated means, one in each of said control lines for opening and closing the corresponding line, and (g) a plurality of switch units, each including a plurality of normally closed switches one in each of said control lines and actuating means for selectively opening one of said switches.

2. The coded control unit of claim 1 wherein, (a) said second electroresponsive controller includes a pair of windings one of which moves the switching means to the closed position and the other of which moves the switching means to the open position, (b) the first of said windings being in said coded circuit, and (c) a normally open switch means is adapted to connect the second of said windings to a source of power.

3. In a coded control, (a) a first electroresponsive control means, (b) a second electroresponsive control means having circuit altering means connected to control said first electroresponsive control means, (c) a plurality of control lines connected in circuit with the second electroresponsive control means to form a coded control circuit, (d) a multiple position coded means having a plurality of circuit altering means connected one each in each control line for operably opening and closing of the control lines, (e) a plurality of switching units each having a plurality of dual positionable circuit altering means connected one each in each control line for operably opening and closing the control line, and (f) a switch means adapted to simultaneously connect said first electroresponsive control means and said coded control circuit to a source of power.

4. The coded control of claim 3 wherein, (a) each of said switching units is a wafer-type assembly including a plurality of circumferentially arranged normally closed switches and having an input for selectively opening one of said switches, and (b) circuit means in said coded-control circuit connect corresponding switches of said switch assemblies in series with each other and with a corresponding circuit altering means of the coded means to provide a corresponding number of parallel branch circuits connected in series with said second electroresponsive means for coded operation thereof and of said first electroresponsive means.

5. The coded control of claim 3 having, (a) an electroresponsive load, (b) circuit altering means controlled by the first electroresponsive means and connected in circuit with the load, and (c) said switch means is a single-pole double-throw control switch having a first closed switching position connected in circuit with said load and associated circuit altering means and a second closed switching position connected in circuit with said coded control circuit and said first electroresponsive control means whereby only one of said circuits is completed therethrough at any one time.

6. The coded control of claim 5 having, (a) a set of holding contacts coupled to said second electroresponsive means and connected in parallel with the second closed switching position of said control switch.

7. The coded control circuit of claim 5 wherein, (a) said circuit altering means of said second electroresponsive means is a switch conjointly controlled by a pair of windings forming a part of the second electroresponsive means, (b) a first of said windings being connected to the plurality of control lines and being adapted to move said switch to an open circuit position and the second of said windings being adapted to move said switch to a closed circuit position, and (c) a limited access switch means connecting the second of said windings in an operating circuit.

8. In a coded control circuit, (a) a load, (b) an electroresponsive control means having contact means connected to control said load, (c) a code card reader having a plurality of individual spaced contact elements urged into engagement with a common contact member, (d) a code carrier having a series of code rows with code areas spaced in accordance with said contact elements, certain of said areas being open and others of said areas being closed, (e) a plurality of wafer-type switch units each including a plurality of circumferentially arranged normally closed switches, at least one for each of said spaced elements, each of said switch units having an input for selectively opening one of said switches, and (f) circuit means connecting corresponding switches of said switch units in series branch circuits with each other and with the corresponding contact element and connecting said branch circuits in parallel with each other and in series with said electroresponsive means for coded operation thereof and of said load.

9. In a coded control unit, (a) a plurality of control lines, (b) a multiple position code reader having contact means connected one each in each of the control lines and adapted to receive and couple a coded means to the contact means, said code means selectively opening preselected ones of the plurality of contact means and closing other of the contact means, (c) a plurality of code switching units, each of said units having a rotating switch member coupled to a plurality of circuit switching means connected one each in each of said pluralities of control lines, (d) means connecting the corresponding circuit switching means in the code switching units in series with each other and with the corresponding coded means of the code reader, said circuit switching means each having a first control position completing the corresponding control line to the contact means and a second control position opening the control line, and (e) said switch members being positioned to set one of the switching means in each of said code switching units in the second control position in accordance with the combination of the closed contact means of the code reader established by a coded means.

References Cited

UNITED STATES PATENTS

| | | | |
|---|---|---|---|
| 2,656,497 | 10/1953 | Schweighofer et al. | |
| 2,918,615 | 12/1959 | Goetz. | |
| 3,061,764 | 10/1962 | Paul et al. | 204—46 X |
| 3,189,764 | 6/1965 | Gavreau et al. | |
| 3,247,425 | 4/1966 | Erickson | 307—115 X |

ORIS L. RADER, *Primary Examiner.*

T. B. JOIKE, *Assistant Examiner.*

UNITED STATES PATENT OFFICE
CERTIFICATE OF CORRECTION

Patent No. 3,340,409 September 5, 1967

Walter L. Probert et al.

It is hereby certified that error appears in the above numbered patent requiring correction and that the said Letters Patent should read as corrected below.

Column 7, line 34, after "spaced" insert -- contact --.

Signed and sealed this 12th day of November 1968.

(SEAL)
Attest:

Edward M. Fletcher, Jr.
Attesting Officer

EDWARD J. BRENNER
Commissioner of Patents